United States Patent [19]
Hayashi et al.

[11] Patent Number: 5,920,948
[45] Date of Patent: Jul. 13, 1999

[54] WIPER DEVICE

[75] Inventors: Kazuhiro Hayashi, Kariya; Akira Kato, Anjo; Shinji Makita, Kariya, all of Japan

[73] Assignee: Denso Corporation, Kariya, Japan

[21] Appl. No.: 09/040,337

[22] Filed: Mar. 18, 1998

[30] Foreign Application Priority Data

Apr. 2, 1996 [JP] Japan ................................. 9-084151

[51] Int. Cl.$^6$ ................................ B60S 1/02; B60S 1/26; B60S 1/24
[52] U.S. Cl. ........................................ 15/250.21
[58] Field of Search .......................... 15/250.21, 250.23, 15/250.13, 250.351, 250.3, 250.31

[56] References Cited

U.S. PATENT DOCUMENTS

| | | | |
|---|---|---|---|
| 3,599,270 | 8/1971 | Mori ..................................... | 15/250.23 |
| 3,831,221 | 8/1974 | Gmeiner et al. ..................... | 15/250.21 |
| 4,683,605 | 8/1987 | Leroy et al. ......................... | 15/250.21 |
| 4,720,885 | 1/1988 | Leroy et al. ......................... | 15/250.21 |

FOREIGN PATENT DOCUMENTS

| | | | |
|---|---|---|---|
| 406096 | 1/1991 | European Pat. Off. ............ | 15/250.21 |
| 3734201 | 4/1989 | Germany ............................. | 15/250.21 |
| 59-186159 | 12/1984 | Japan . | |
| 62-94456 | 4/1987 | Japan ................................ | 15/250.351 |
| 63-43853 | 2/1988 | Japan . | |
| 63-215450 | 9/1988 | Japan . | |
| 1-229747 | 9/1989 | Japan . | |
| 4-5573 | 1/1992 | Japan . | |

OTHER PUBLICATIONS

Wiper which can wipe area with small unwiped portion, Nikkei Mechanical 4. 15, 1996, No. 4778 received by Nippondenso Technical Document Center on Apr. 18, 1996.

*Primary Examiner*—Gary K. Graham
*Attorney, Agent, or Firm*—Pillsbury Madison & Sutro LLP

[57] ABSTRACT

A wiper device is composed of a wiper blade and a wiper arm connected to the wiper blade, a first drive link having a stationary joint rotatably secured to a portion of a vehicle, a second drive link having a first movable joint and a second movable joint connected to the wiper arm. The second drive link and the wiper arm are arranged so that the first movable joint can move along a track crossing a straight line connecting the stationary joint and the second movable joint. The first and second drive links are folded when the wiper arm is going to turn and reverse its course.

6 Claims, 9 Drawing Sheets

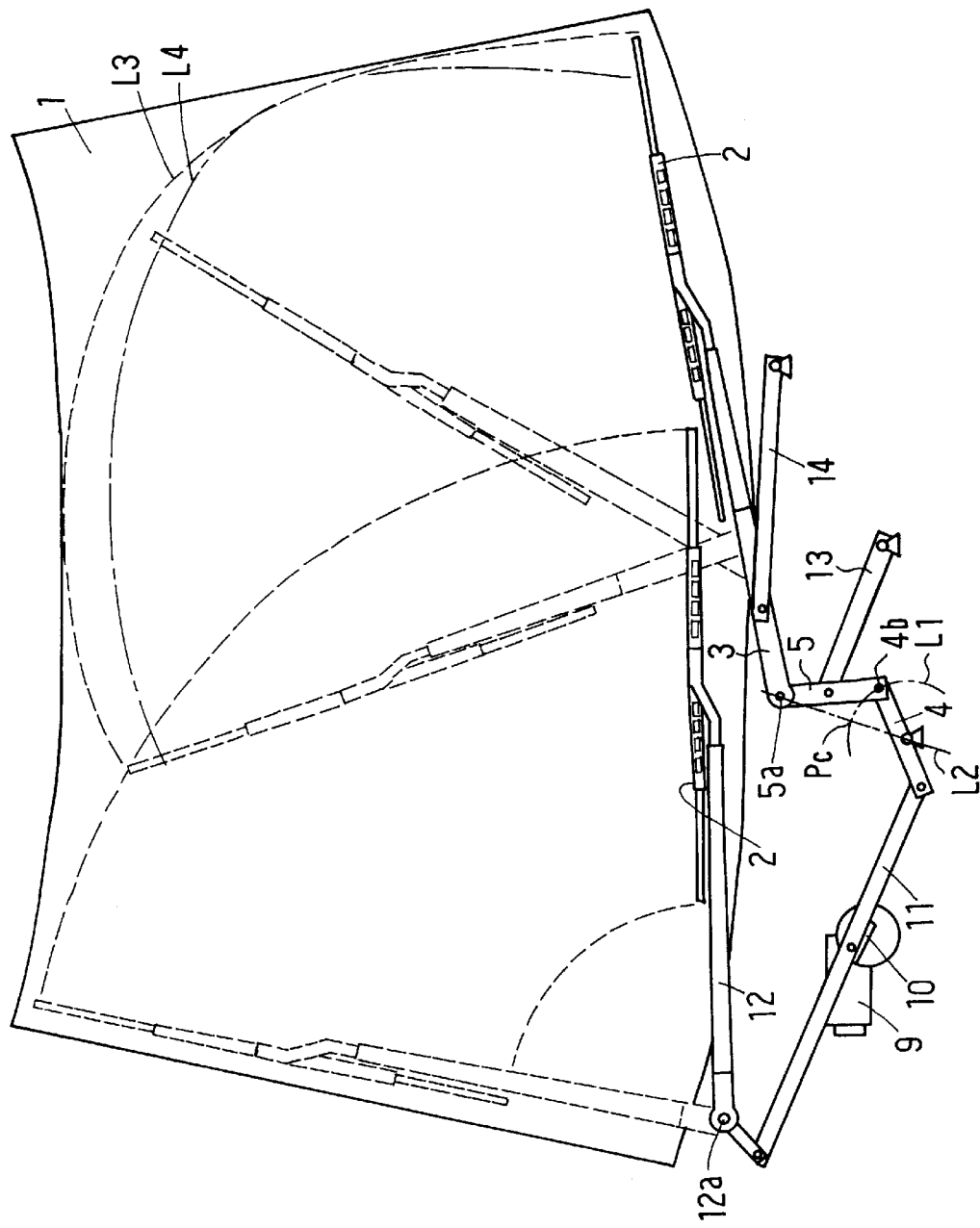

WIPER DEVICE

CROSS REFERENCE TO RELATED APPLICATION

The present application is based on and claims priority from Japanese Patent Application Hei 9-84151, filed on Apr. 2, 1997, the contents of which are incorporated herein by reference.

BACKGROUND OF THE INVENTION

1. Field of the Invention

The present invention relates to a wiper device for wiping a glass pane of a vehicle window, in particular, the windshield of the front passenger seat.

2. Description of the Related Art

In general, a wiper device for a vehicle has a wiper arm which swings on a surface of a window pane, and the tip of the wiper arm of a wiper blade moves back and forth in an arc. Since the surface of the window pane is generally rectangular, areas in the corners of the window pane can not be wiped out.

U.S. Pats 4,683,605 and 4,720,885 (which correspond to JP-A61-181745) disclose a four-joint-link mechanism. The four joint link mechanism is composed of a drive link connected to a motor and rotatably secured to a portion of a vehicle, a control link rotatably secured to a portion of the vehicle, and a coupling link for coupling the drive link and the control link via two movable joints. Although this mechanism increases the wiping area by a length of the drive link, the size of the mechanism is not sufficiently compact.

SUMMARY OF THE INVENTION

Therefore, it is a main object of the invention is to provide a compact wiper device which can wipe out a wider portion the corner area.

According to an aspect of the invention, the wiper device is composed of a first drive link having a stationary joint at one end thereof and, a second drive link having a first movable joint connecting to the other end of the first drive link at one end thereof and a second movable joint connecting the wiper arm at the other end thereof. The second drive link and the wiper arm are arranged so that the first movable joint can move along a track which crosses a straight line connecting the stationary joint and the second movable joint.

Thus, the first drive link and the second drive link are aligned at the cross point of the track and the straight line connecting the stationary joint and the second movable joint so that the distance between the stationary joint and the second movable joint becomes a maximum.

According to another aspect of the invention, the first and second drive links and the wiper arm are folded when the wiper arm turns to reverse its course. As a result, when the wiper arm turns, the angle between the first and second drive links does not increase very much, and the speed change of the wiper arm can be maintained considerably small.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 10 is a schematic general view of a wiper according to a second embodiment of the present invention applied to a windshield of a vehicle;

Figure 1:
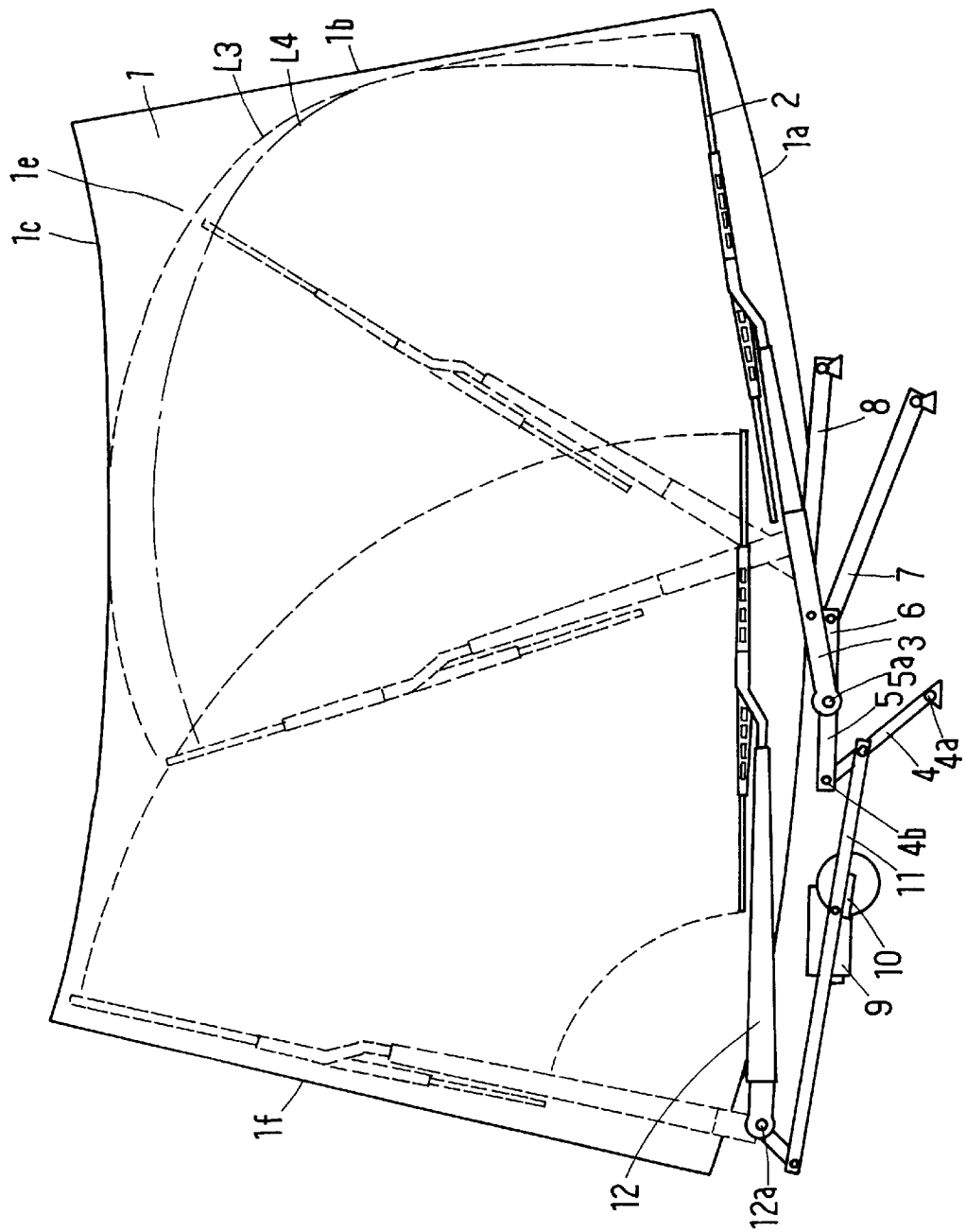
FIG. 1 is a schematic general view of the wiper device according to a first embodiment of the present invention applied to a windshield of a vehicle.

DETAILED DESCRIPTION OF THE PREFERRED EMBODIMENTS (First Embodiment)

A wiper device for windshield glass 1 according to a first embodiment of the present invention is described with reference to FIGS. 1–9. The wiper device for the front passenger seat is composed of wiper blade 2, wiper arm 3 which swings wiper blade 2 on the surface of windshield glass 1, first drive link 4 which has stationary joint 4a rotatably secured to a portion of a vehicle at one end thereof and a second drive link 5 which has first movable joint 4b rotatably connecting the other end of first drive link 4 at one end of second drive link 5 and second movable joint 5a connecting the other end of wiper arm 3 at the other end of second drive link 5. Second drive link 5 has a first control portion 6 extending from second movable joint 5a in the direction opposite second drive link 5. The tip of first control portion 6 is connected to an end of first control link 7, whose the other end is rotatably secured to a portion of the vehicle. One end of second control link 8 is rotatably secured to a portion of the vehicle, and the other end of second control link 8 is rotatably connected to wiper arm 3 at the portion thereof shifted from second movable joint 5a toward wiper blade 2. Second control link 8, first control portion 6 of second drive link 5 and first control link 7 form a control mechanism which controls second drive link 5 and wiper arm 3 so that first movable joint 4b can move in a track L1 that crosses a straight line L2 connecting stationary joint 4a and second movable joint 5a as shown in FIG. 4.

Rotation of motor 9, which is secured to a portion of the vehicle, is converted into reciprocating motion by links 10, 11 to swing first drive link 4 about stationary joint 4*a*, wiper arm 12 for the driver's seat is swung by link 11 about a joint 12*a* disposed at an end of wiper arm 12. The operation of the wiper device is described hereafter.

Figure 2:
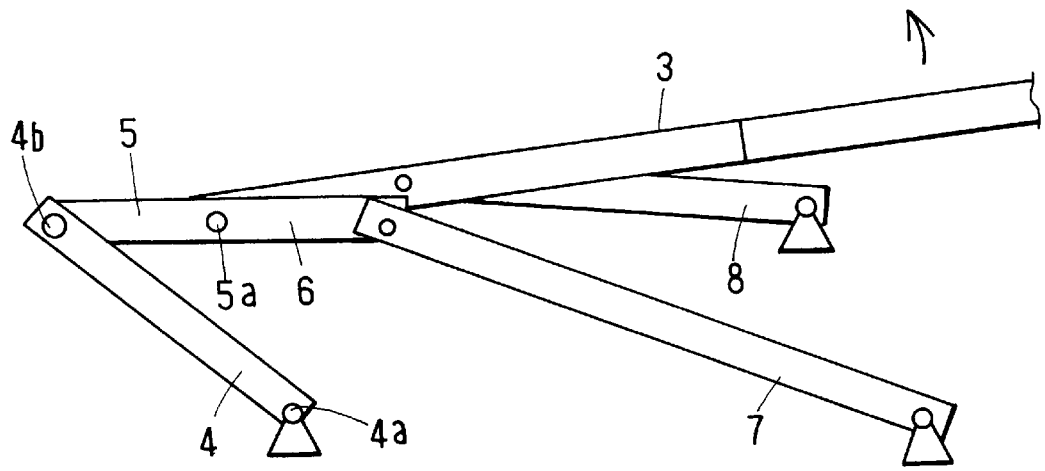
FIG. 2 is a schematic diagram illustrating a link mechanism of the wiper according to the first embodiment.
Figure 3:
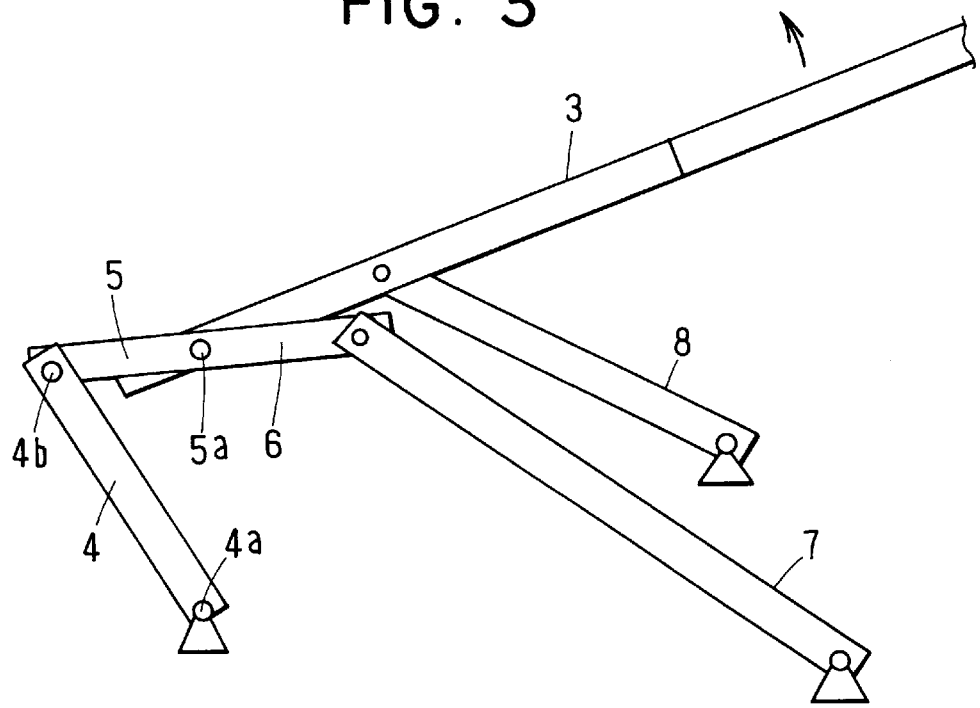
FIG. 3 is a schematic diagram illustrating a link mechanism of the wiper according to the first embodiment.

When motor 9 is not operated, wiper arm 3 rests on lower side 1*a* of windshield glass 1 as shown in FIG. 1 and FIG. 2. When motor 9 is operated, first drive link 4 is driven to swing second drive link 5 and wiper arm 3 and lift control links 7, 8 as shown in FIG. 3. When first drive link 4 moves to the right, first drive link 4, second drive link 5 and wiper arm 3 are aligned with one another as shown in FIG. 4. Thus, the distance between stationary joint 4*a* and second movable joint 5*a* increases and extends the tip of wiper arm 3 to upper right corner 1*e* of windshield glass 1. As first drive link 4 further swings, first movable joint 4*b* moves in track L1 as shown in FIG. 5 and crosses straight line L2 connecting stationary joint 4*a* and second movable joint 5*a*, and first stationary joint 4*b* shifts from the left side of line L1 to the right side thereof. Accordingly, the distance between stationary joint 4*a* and second movable joint 5*a* is reduced, thereby retracting wiper arm 3.

Figure 4:
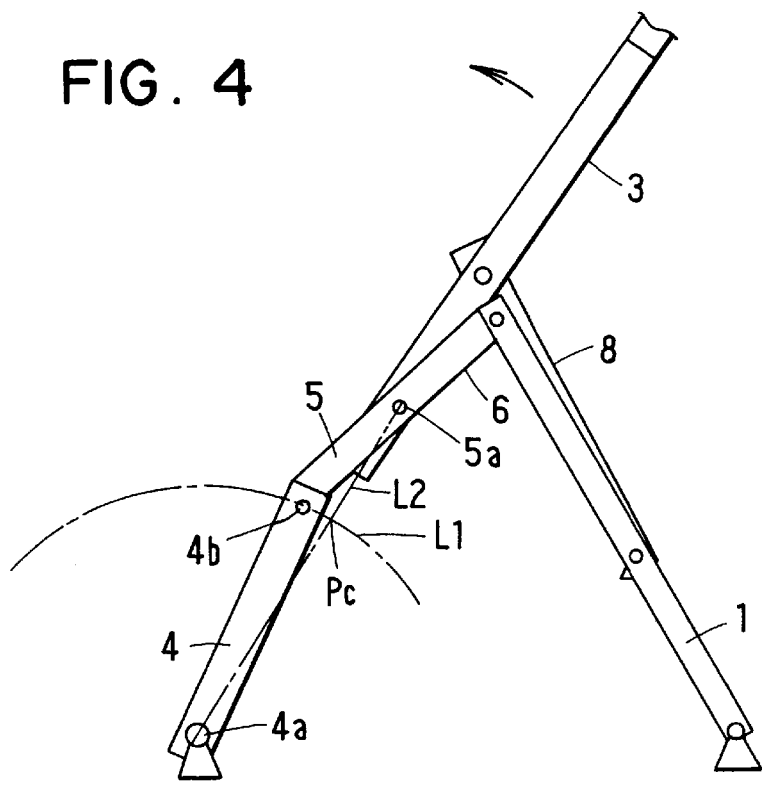
FIG. 4 is a schematic diagram illustrating a link mechanism of the wiper according to the first embodiment.
Figure 5:
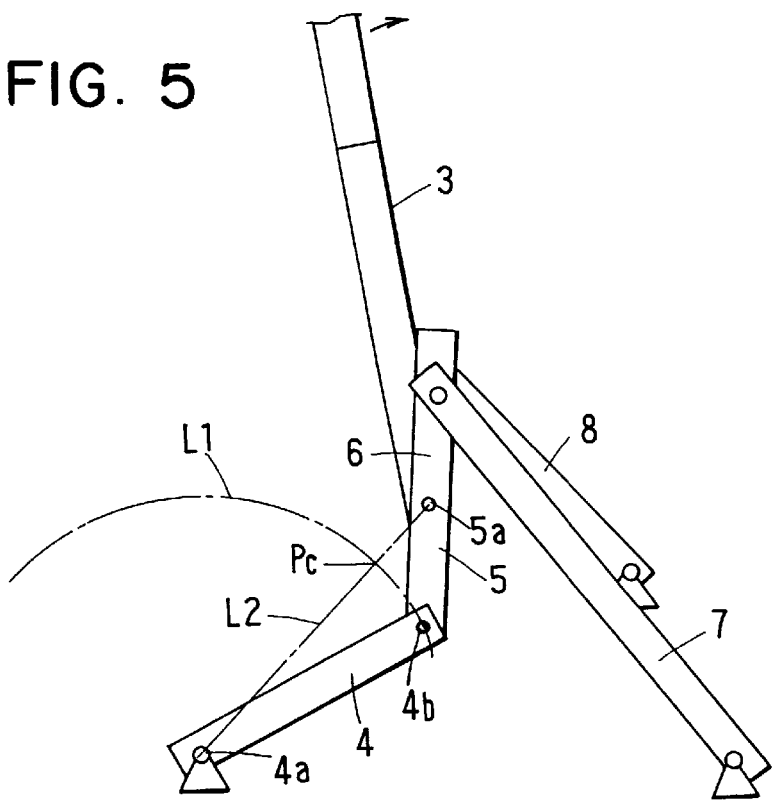
FIG. 5 is a schematic diagram illustrating a link mechanism of the wiper according to the first embodiment.

When motor 9 rotates further, link 11 moves to the driver's seat side, and the wiper arm and the links return their steps from the step shown in FIG.5 through the steps shown in FIGS. 4, 3 to the step shown in FIG. 2.

As indicated by a broken line L3 in FIG. 1, the tip of wiper blade 2 can be extended by the sum of the length of first drive link 4 and the distance between first movable joint 4*b* and second movable joint 5*a* on second drive link 5 from one-dot chain line L4 which is a track of the tip of the wiper blade of the prior art discussed before. It is noted that where the tip of wiper blade is not fully extended, first drive link 4 and second drive link 5 are folded to each other with respect to first movable joint 4*b* so that the link mechanism can be made compact.

Figure 6:
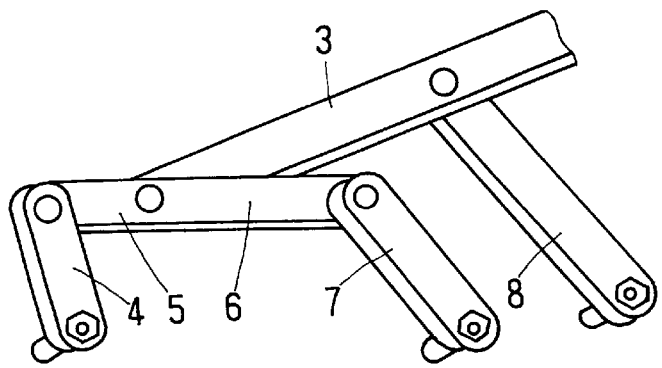
FIG. 6 is a schematic diagram illustrating a link mechanism of a variation of the wiper according to the first embodiment.

In a variation of the link mechanism shown in FIG. 6, wiper arm 3 is put on the upper surface of second control link 8 to be connected, second drive link 5 with first control link portion is put on the upper surface of wiper arm 3 to be connected, and first drive link 4 is put on the upper surface of second drive link 5 to be connected. This prevents interference between the links.

Figure 7:
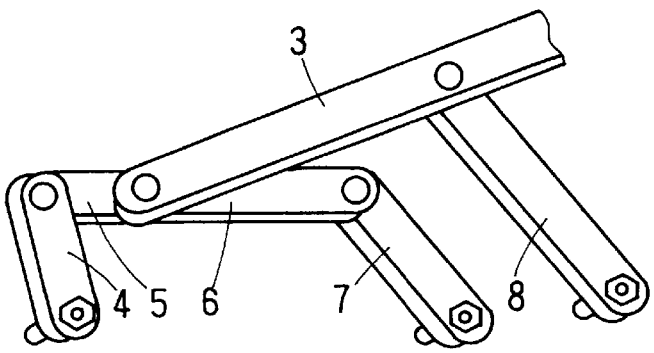
FIG. 7 is a schematic diagram illustrating a link mechanism of a variation of the wiper according to the first embodiment.

In another variation of the link mechanism shown in FIG. 7, wiper arm 3 is put on the upper surface of second control link 8 to be connected, second drive link 5 with first control link portion is put on the lower surface of wiper arm 3 to be connected, and first drive link 4 is put on the upper surface of second drive link 5 to be connected. This can make the link mechanism compact also.

Figure 8:
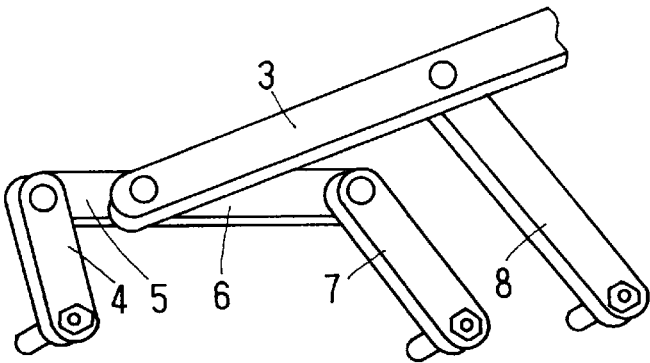
FIG. 8 is a schematic diagram illustrating a link mechanism of a variation of the wiper according to the first embodiment.

In another variation of the link mechanism shown in FIG. 8, wiper arm 3 is put on the upper surface of third control link 8 to be connected, second drive link 5 with first control link portion is put on the lower surface of wiper arm 3 to be connected, and first drive link 4 is put on the upper surface of second drive link 5 to be connected. This can reduce the thickness of the link mechanism.

Figure 9:
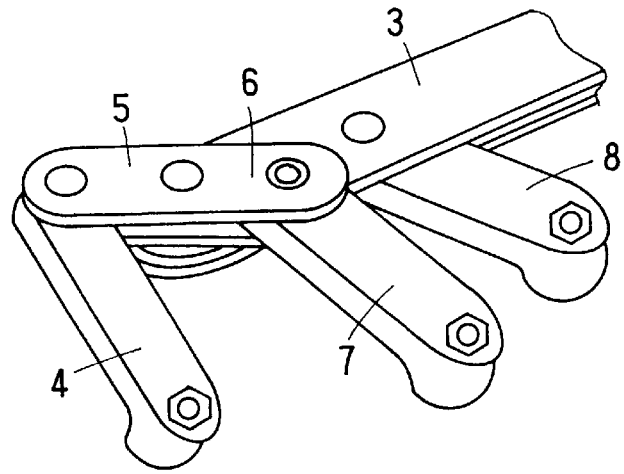
FIG. 9 is a schematic diagram illustrating a link mechanism of a variation of the wiper according to the first embodiment.

In another variation of the link mechanism shown in FIG. 9, wiper arm 3 is composed of a pair of members, and second drive link 5 with control portion 6 is composed of a pair of members so that a second control link 8 can be sandwiched by wiper arm 3 and first drive link 4 and first control link 7 can be sandwiched by second drive link 5. This can increase stiffness of the link mechanism.

(Second Embodiment)

Figure 11A:
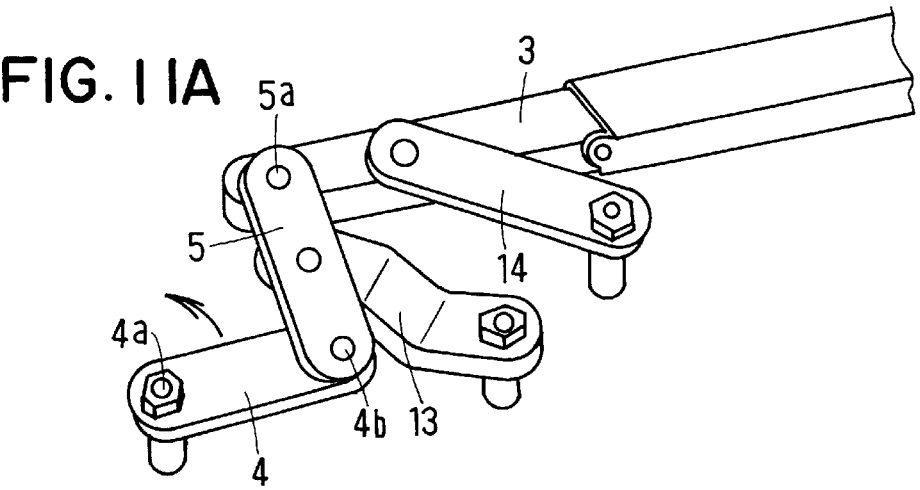
FIGS. 11A, 11B and 11C are schematic diagrams illustrating operation of a link mechanism of the wiper device according to the second embodiment.
Figure 11B:
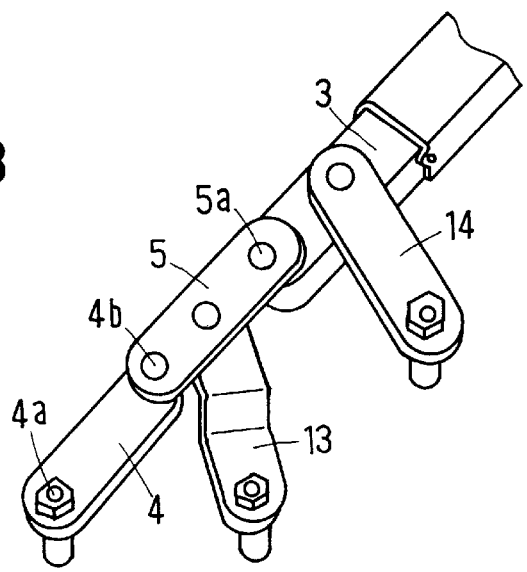
Figure 11C:
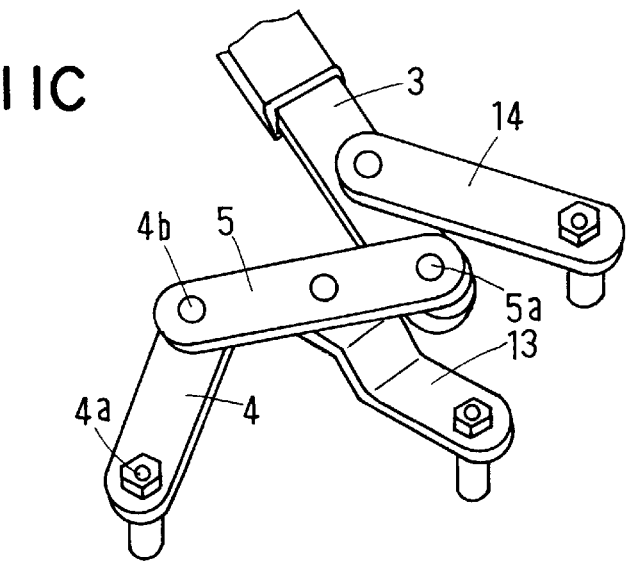
Figure 12:
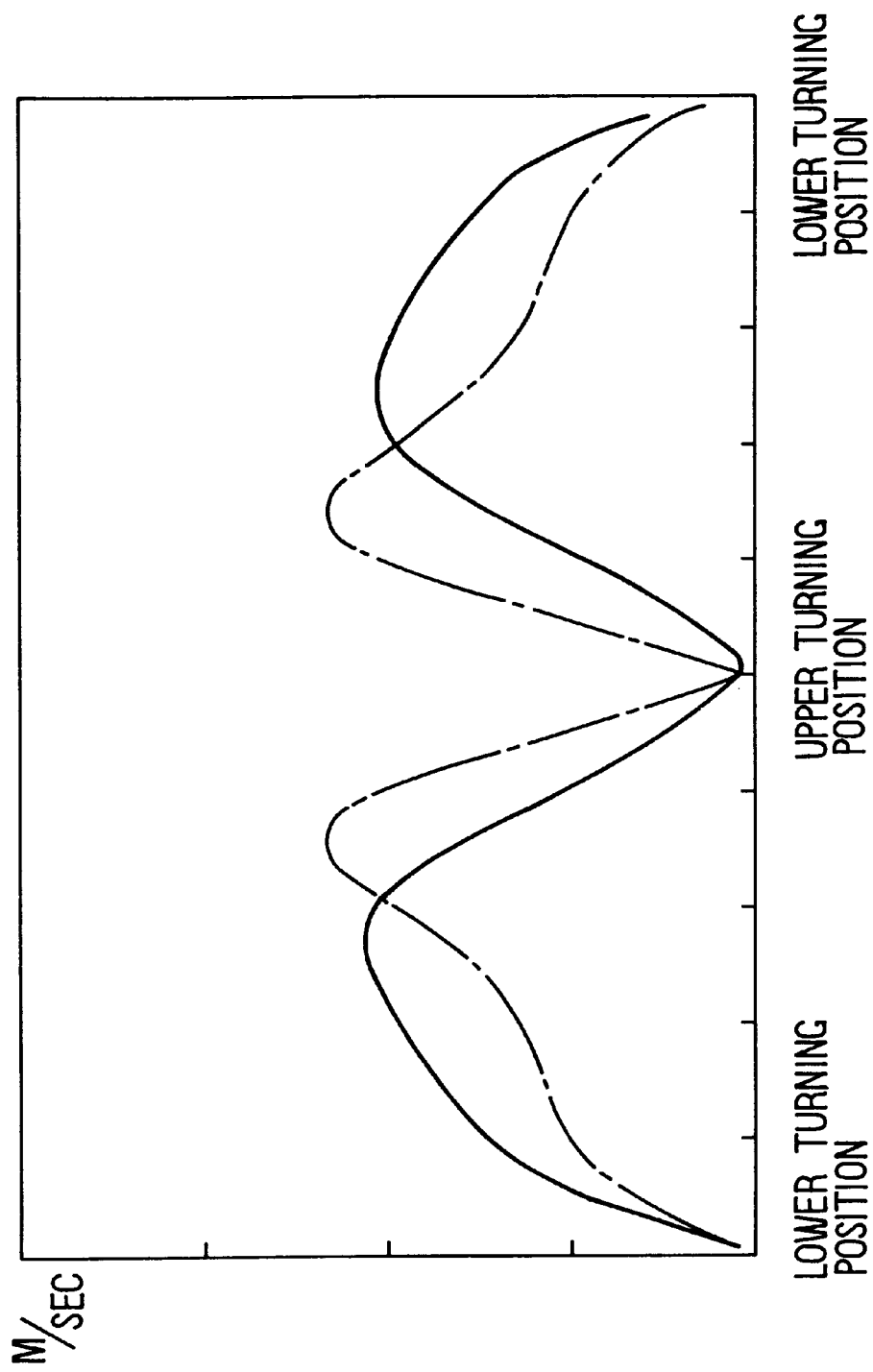
FIG. 12 is a graph showing a relationship between speed of the wiper blade and position of thereof.

A wiper device according to a second embodiment is described with reference to FIGS. 10, 11 and 12. The same reference numeral corresponds to the same element as described in the first embodiment. In this embodiment, first drive link 4, second drive link 5 and wiper arm 3 are arranged so that first drive link and wiper arm can be disposed in parallel with each other when wiper arm is going to turn at the lower turning position.

An end of control link 13 is rotatably secured to a portion of a vehicle, and the other end thereof is rotatably connected to second drive link 5. The opposite ends of second drive link are rotatably connected to first and second movable joints 4*b*, 5*a* respectively. An end of control link 14 is rotatably secured to a portion of the vehicle, and the other end is rotatably connected to wiper arm 3 at a portion shifted from second movable joint 5*a* toward wiper blade 2. Control links 13, 14 form a control mechanism. First drive link 4 is secured by stationary joint 4*a* to a portion of the vehicle at the middle thereof, however it can be changed as shown in FIG. 1.

When the distance between first movable joint 4*b* and cross point Pc becomes maximum and first and second drive links 4, 5 are folded to the maximum, first drive link 4 and wiper arm 3 become parallel with each other to restrict cross angle of wiper arm 3 and first drive link 4. It is desirable that the maximum cross angle between first drive link 4 and wiper arm 3 is less than 65°. Thus, speed change of wiper blade 2 can be moderated as indicated by a solid line shown in FIG. 12, thereby improving visibility of the driver. In FIG. 12, a one-dot-chain line indicates speed changes of the prior art discussed before. Wiper blade 2 rises up from the lower turning position as shown in FIG. 11A, extends the tip of wiper blade 2 as shown in FIG. 11B and increases the wiping speed in the middle. The links are folded as shown in FIG. 11C, and the speed reduces gradually until wiper blade 2 turns at the upper turning position. Thereafter, wiper blade 2 falls down, tracing the course which is reverse to the rise-up course. Thus, first movable joint 4*b* moves in track L1 crossing straight line L2 connecting stationary joint 4*a* and second movable joint 5*a*. The cross angle at the lower turning position is arranged to be less than about 8°.

(Third Embodiment)

Figure 13A:
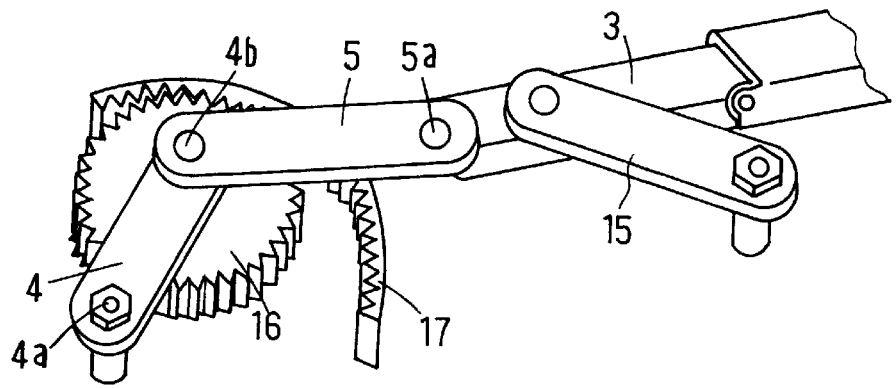
FIGS. 13A, 13B and 13C are schematic diagrams illustrating a link mechanism of a wiper according to a third embodiment of the present invention.
Figure 13B:
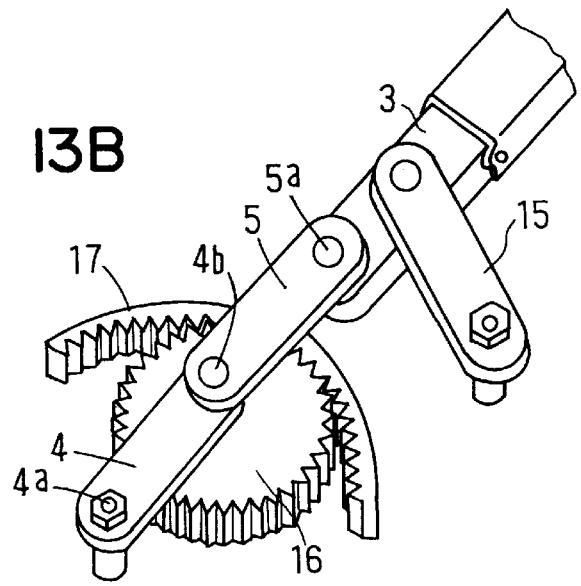
Figure 13C:
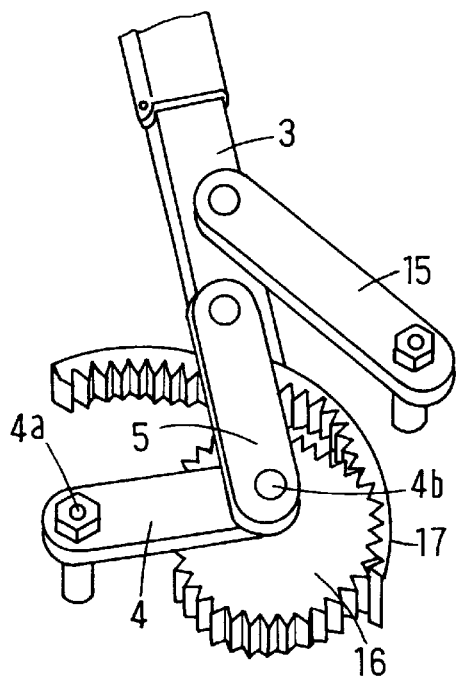

A wiper device according to a third embodiment of the present invention is described with reference to FIGS. 13A–13C. The same reference numeral indicates the same element as described in the first embodiment. A control mechanism is composed of control link 15, external gear 16 and internal gear 17 in mesh with external gear 16. One end of control link 13 is rotatably connected to the wiper arm and the other end thereof is rotatably secured to a portion of a vehicle. External gear 16 is rotatably disposed at first movable joint 4*b* to swing together with second drive link 5, and internal gear 17 is secured to a portion of the vehicle. The operation is substantially the same as the first embodiment.

(Fourth Embodiment)

Figure 14A:
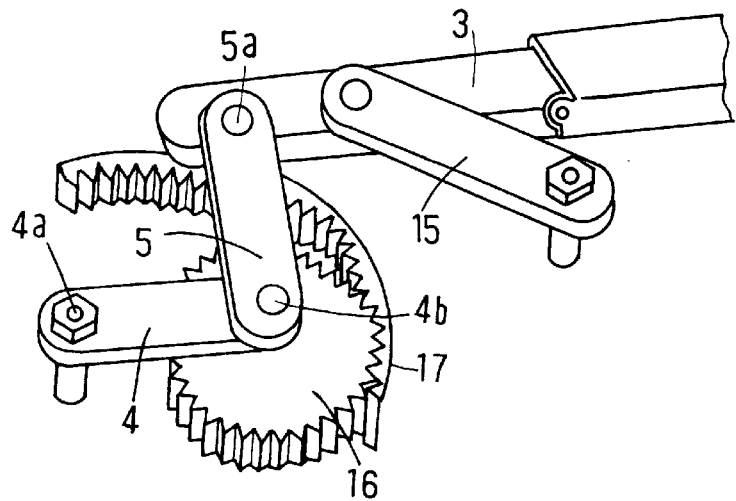
FIGS. 14A, 14B and 14C are schematic diagrams illustrating a link mechanism of the wiper according to the third embodiment.
Figure 14B:
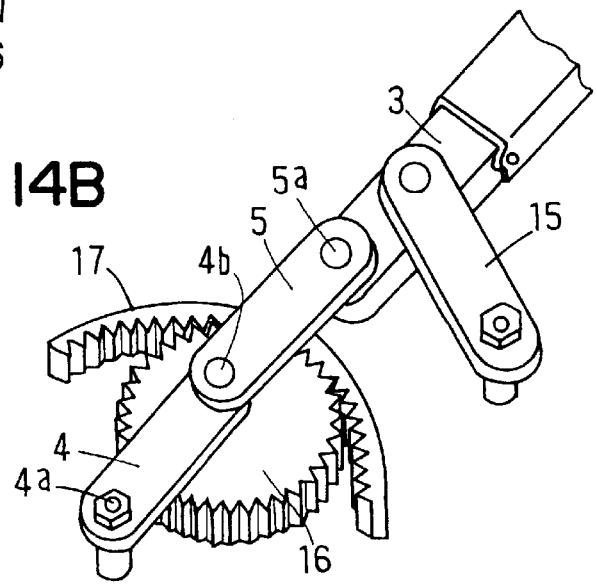
Figure 14C:
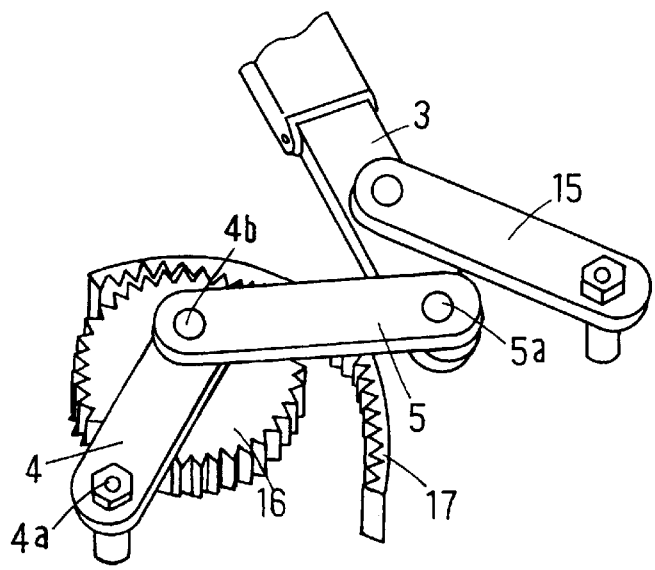

A wiper device according to a fourth embodiment is shown in FIGS. 14A–14C. The same reference numeral indicates the same element shown in FIGS. 13A–13C.

In this embodiment, first drive link 4, second drive link 5 and wiper arm 3 are arranged so that first drive link 4 and wiper arm 3 can be disposed n parallel with each other when wiper arm 3 is going to turn at the lower turning position as described with regard to the second embodiment.

In the above embodiments, first drive link 5 or second control link 7 can be driven directly by motor 9 instead of drive link 4.

The present invention can be applied to various wiper device such as a wiper device for a rear window of a vehicle or a wiper device for a train.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A wiper device comprising:

a wiper blade;

a wiper arm having one end connected to said wiper blade;

a first drive link having a stationary joint disposed at one end thereof rotatably secured to a portion of a vehicle;

a second drive link having a first movable joint disposed at one end thereof connected to the other end of said first drive link and a second movable joint disposed at the other end thereof connected to the other end of said wiper arm; and a control mechanism, connected to said second drive link and said wiper arm, for controlling said first movable joint to move along a track crossing a straight line connecting said stationary joint and said second movable joint, wherein said control mechanism aligns said first drive link, said second drive link and said wiper arm to increase a distance between said stationary joint and said second movable joint when said first movable joint crosses said straight line, wherein said control mechanism comprises a first control link connected to said second drive link and a second control link connected to said wiper arm.

2. The wiper device as claimed in claim 1, wherein said first and second drive links are folded when said wiper arm turns to reverse its course.

3. A wiper arm comprising:

a wiper blade;

a wiper arm having one end connected to said wiper blade;

a first drive link having a stationary joint disposed at one end thereof rotatably secured to a portion of a vehicle;

a second drive link having a first movable joint disposed at one end thereof connected to the other end of said first drive link and a second movable joint disposed at the other end thereof connected to the other end of said wiper arm; and a control mechanism, connected to said second drive link and said wiper arm, for controlling said first movable point to move along a track crossing a straight line connecting said stationary joint and said second movable point, wherein said control mechanism aligns said first drive link, said second drive link and said wiper arm to increase a distance between said stationary joint and said second movable joint when said first movable joint crosses said straight line, wherein said control mechanism comprises:

a control link rotatably secured to a portion of a vehicle;

an external gear connected to said first movable joint to be movable with said second drive link; and an internal gear secured to a portion of said vehicle and engaging said external gear.

4. The wiper device as claimed in claim 3 wherein said first and second drive links are folded when said wiper arm turns to reverse its course.

5. A wiper device comprising:

a wiper blade;

a wiper arm having one end connected to said wiper blade;

a first drive link having a stationary joint disposed at one end thereof rotatably secured to a portion of a vehicle;

a second drive link having a first movable joint disposed at one end thereof connected to the other end of said first drive link and a second movable joint disposed at the other end thereof connected to the other end of said wiper arm; and a control mechanism, connected to said second drive link and said wiper arm, for controlling said first movable joint to move along a track crossing a straight line connecting said stationary joint and said second movable joint, wherein said control mechanism comprises a first control link connected to said second drive link and a second control link connected to said wiper arm.

6. A wiper device comprising:

a wiper blade;

a wiper arm having one end connected to said wiper blade;

a first drive link having a stationary joint disposed at one end thereof rotatably secured to a portion of a vehicle;

a second drive link having a first movable joint disposed at one end thereof connected to the other end of said first drive link and a second movable joint disposed at the other end thereof connected to the other end of said wiper arm; and a control mechanism, connected to said second drive link and said wiper arm, for controlling said first movable joint to move along a track crossing a straight line connecting said stationary joint and said second movable joint, wherein said control mechanism comprises:

a control link rotatably secured to a portion of a vehicle;

an external gear connected to said first movable joint to be movable with said second drive link; and an internal gear secured to a portion of said vehicle and engages said external gear.

* * * * *